Sept. 7, 1948.  E. C. BURDICK  2,448,575
ELECTRICAL INSTRUMENT FOLLOW-UP SYSTEMS
Filed June 18, 1942  3 Sheets-Sheet 1

INVENTOR.
EDWIN C. BURDICK
BY C. B. Stangenberg
ATTORNEY.

Sept. 7, 1948.　　　　　E. C. BURDICK　　　　　2,448,575
ELECTRICAL INSTRUMENT FOLLOW-UP SYSTEMS
Filed June 18, 1942　　　　　　　　　　　　3 Sheets-Sheet 2
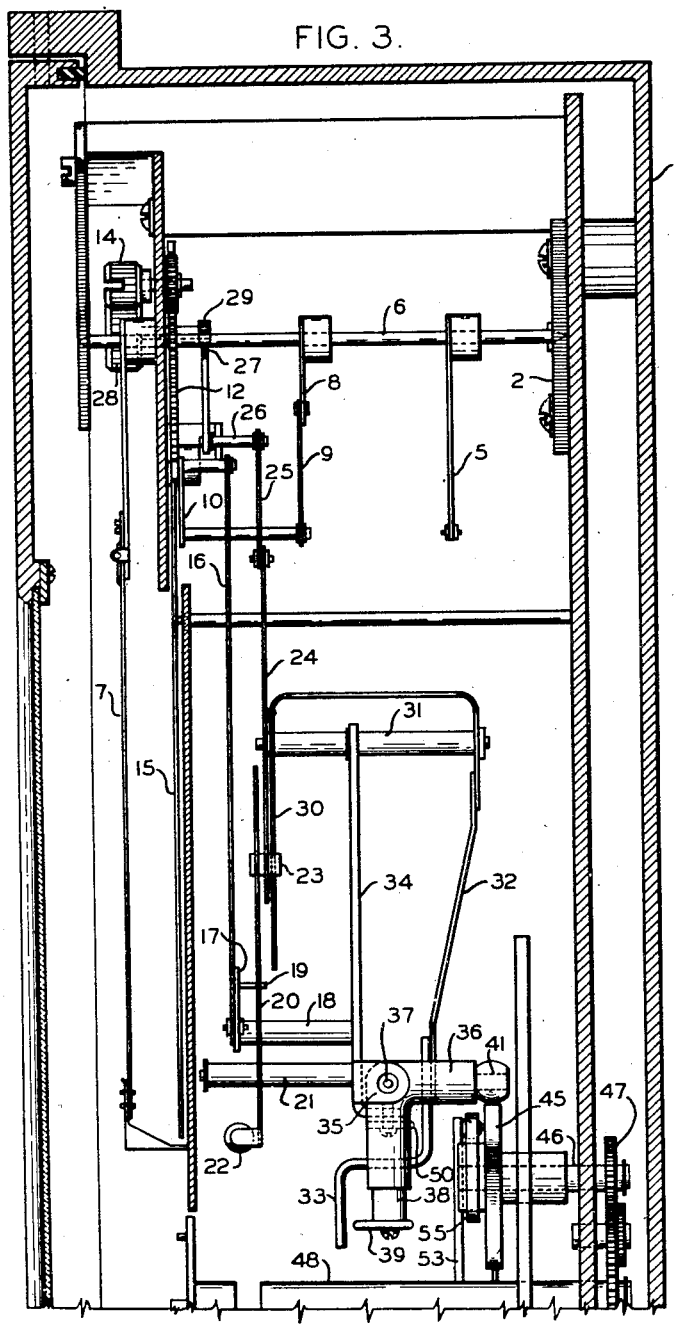
INVENTOR.
EDWIN C. BURDICK
BY
ATTORNEY.

Sept. 7, 1948. E. C. BURDICK 2,448,575
ELECTRICAL INSTRUMENT FOLLOW-UP SYSTEMS
Filed June 18, 1942 3 Sheets-Sheet 3
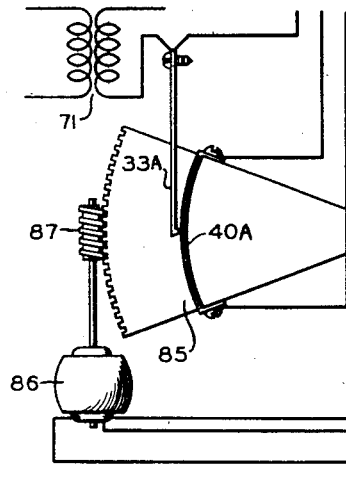
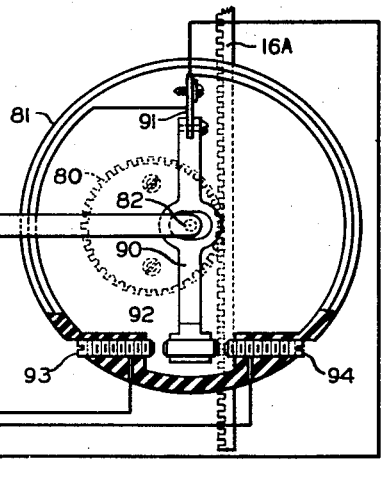
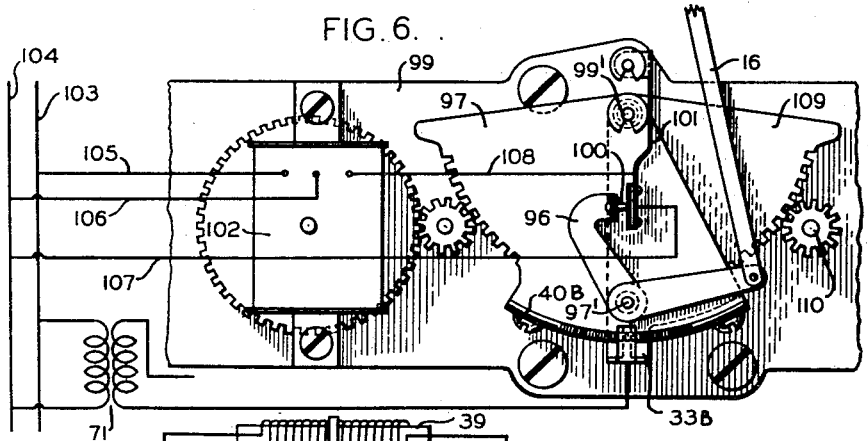
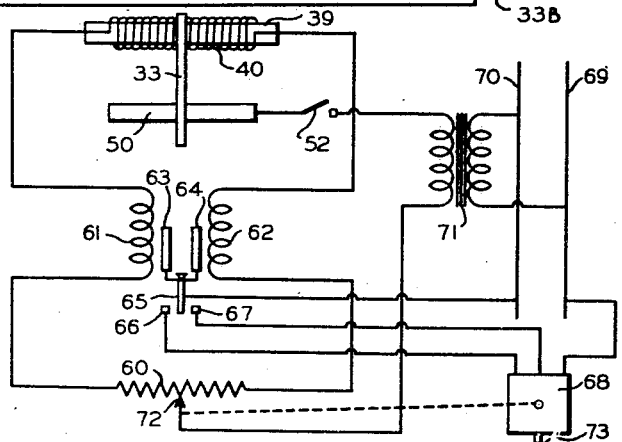
INVENTOR.
EDWIN C. BURDICK
BY E. B. Spangenberg
ATTORNEY.

Patented Sept. 7, 1948

2,448,575

UNITED STATES PATENT OFFICE 2,448,575

ELECTRICAL INSTRUMENT FOLLOW-UP SYSTEM

Edwin C. Burdick, Philadelphia, Pa., assignor to The Brown Instrument Company, Philadelphia, Pa., a corporation of Pennsylvania Application June 18, 1942, Serial No. 447,543

11 Claims. (Cl. 318—29)

The present invention relates to electric control apparatus and a general object of the invention is to provide a control instrument with electric contact mechanism of improved type, and well adapted for use in a control instrument in which a control contact is directly adjusted by a relatively weak meter element, such as the Bourdon tube element of a fluid pressure thermometer.

A more specific object of the invention is to provide an improved control instrument including one or another form of my improved contact mechanism and adapted for use in, and as a part of an electric proportioning system, thereby preventing inaccurate and unreliable operation of the electric proportioning system due either to insufficient contact pressure or to frictional resistance great enough to prevent proper relative movements of the measuring contact and slide wire resistance elements of the control system.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 3 is a vertical transverse section through a portion of the instrument shown in Fig. 1;

Fig. 4 is a diagram illustrating a control system in which use is made of the instrument shown in Figs. 1, 2 and 3;

Fig. 5 is a somewhat diagrammatic representation of a portion of a second form of control instrument; and Fig. 6 is a somewhat diagrammatic representation of a portion of a third form of a control instrument.

Figures 1, 2:
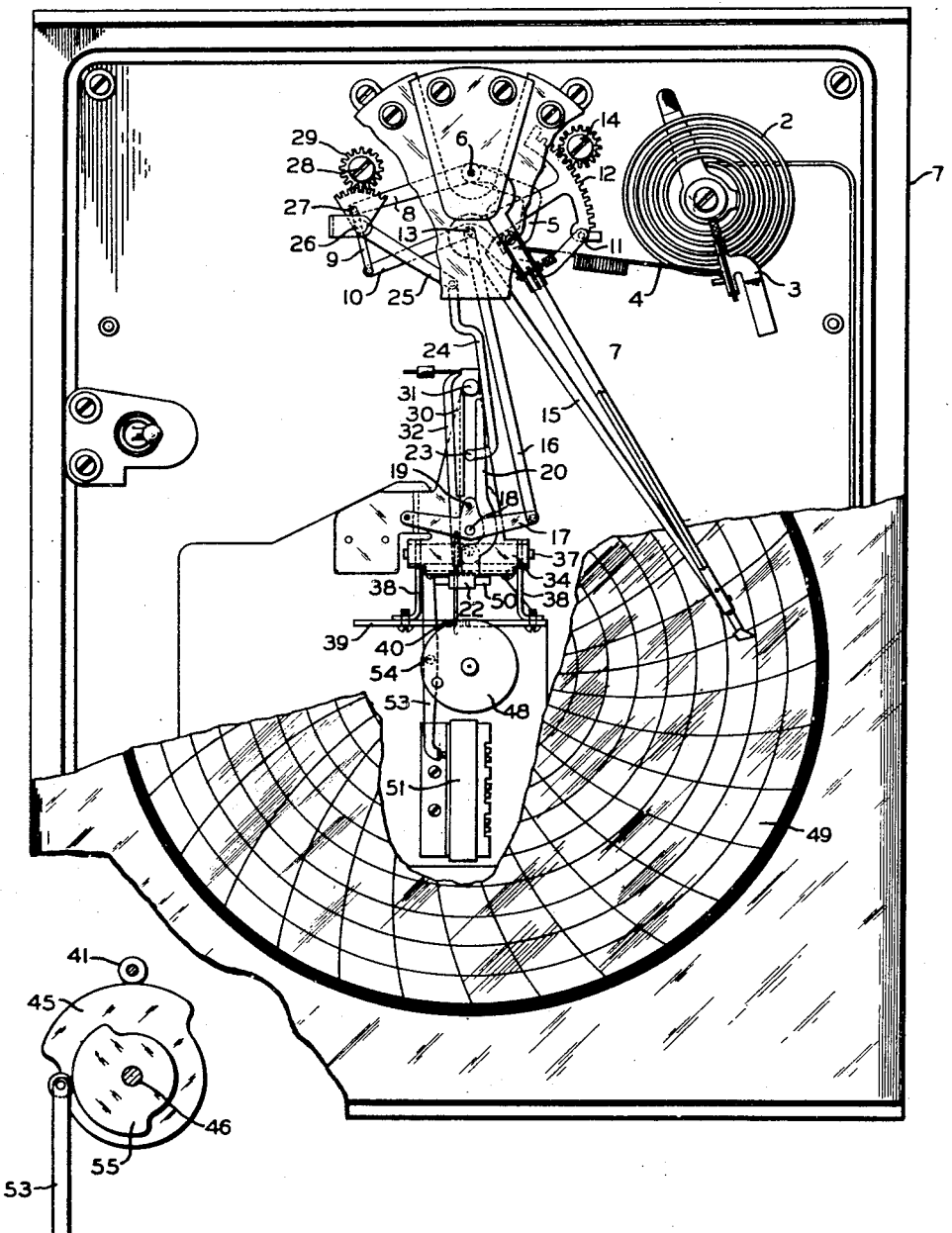
Fig. 1 is an elevation showing essential parts of an electric control instrument adapted for use in, and as a part of, an electric proportioning system.
Fig. 2 is an elevation of cams included in the instrument shown in Fig. 1.

In Figs. 1, 2 and 3 I have illustrated a measuring and control instrument 1 adapted for use in and as a part of the electric proportioning system, shown diagrammatically in Fig. 4, and including a preferred form of my novel contact mechanism. Said instrument includes as its meter element, a Bourdon tube 2 of spiral form having its inner end stationary and having its movable outer end connected by a connector part 3 and a link 4 to an arm 5 carried by a rock shaft 6 journalled in the instrument framework and carrying a pen arm 7. The oscillation of the shaft 6 acts through its arm 8 and a connecting link 9 to give movements to one end of a floating lever 10 which has its opposite end pivotally connected to an adjustable fulcrum member 12. The latter is mounted on a fixed pivot 13, shown as adjacent but slightly below the shaft 6. The member 12 includes a gear segment portion in mesh with a spur gear which forms a part of a manually rotatable control point adjustment device 14. The angular adjustment of the member 12 about its pivot 13 determines the setting of a pointer 15 which indicates the desired value of the temperature or other control quantity for which the spiral tube 2 furnishes a measure.

Intermediate its ends the floating lever 10 is pivotally connected to the upper end of a depending link 16. The latter has its lower end pivotally connected to one arm of a lever 17 journalled on a stationary pivot 18, and has a second arm carrying a pin or projection 19 parallel to the axis of a pivot 18, and bearing against one side of an uprising arm 20. The latter is pivoted at 21 to turn about an axis parallel to the axis of the pivot 18, and is biased to bear at all times against the pin 19, without subjecting the latter to a force great enough to prevent the position of said pin from varying in suitable accordance with the pressure transmitted to the spiral tube 2.

The same side of the arm 20 which is engaged by the pin 19 is also engaged by a pin or cylindrical thrust member 23 which is parallel to the pin 19. The member 23 is connected to the lower end of a link 24, which has its upper end pivotally connected to and supported by an arm 25 carried by a rock shaft 26. A gear segment 27 carried by the shaft 26, is in mesh with a spur gear 29 forming part of a manually rotatable element 28 mounted in the instrument framework. The rotation of the member 28 effects what is commonly called a throttle range adjustment of the control instrument, by adjusting the thrust pin 23 toward and away from the axis 21 of the arm 20 and thereby modifying the extent of angular movement imparted to an arm 30 by a given angular adjustment of the pin 19 and arm 20. The arm 30 and an arm 32 rigidly connected thereto are mounted on a pivot shaft 31, parallel to and above the pivots 18 and 21.

The arm 32 has its lower end connected to and supports a measuring contact 33. The latter as shown is in the form of a bent bar comprising generally vertical upper and lower portions and a horizontal intermediate portion. The instrument framework part 34 which supports the pivot shaft 31, 18 and 21, is provided with horizontally spaced apart ears 35 to which are pivotally connected the hub or trunnion portions 37 of a bell crank lever 36. The latter comprises depending arms 38 to the lower ends of which a horizontally disposed slide wire resistance is secured. The latter, as shown, comprises a flat bar-like support 39 and a slide wire resistor 40 wound about said bar. The latter, as hereinafter appears, serves as a measuring potentiometer resistance. The bell crank lever 36 includes an arm which extends in a generally horizontal direction away from the axis of the trunnions 37, and pivotally supports at its free end a cam roll 41. The latter engages and is supported by the edge of a cam 45 which is carried by a continuously rotating horizontal shaft 46. The latter, as shown, is connected to and rotated by the usual clock motor 47 employed to rotate the shaft or arbor 48 for the chart disc 49 on which a record of the varying value of the quantity measured is recorded by the pen arm 7. Advantageously, the parts are so proportioned that when the cam roll engages a high portion of the edge of the cam 45, the contact 33 will be laterally displaced, as seen in Fig. 3, to the right of the contact 50 and to the left of the slide wire resistor 39.

In Figs. 2 and 3 the cam roll 41 is shown in engagement with a high portion of the cam 45. As its rotation brings a low portion of the cam 45 beneath the lever 36, the latter tilts clockwise under the biasing action of gravity, and thereby moves the slide wire resistance 40 into engagement with the lower end portion of the contact 33, and then turns the latter to the left until its upper portion engages a horizontally elongated contact 50 supported by the framework part 34. When the cam roll 41 is again raised by its engagement with a high portion of the edge of cam 45, the engagement of the contact 33 with the contact 50 and with the slide wire resistance 40 is interrupted.

Sparking between the contact 33 and the slide wire resistance 40 would tend to reduce the operative efficiency of the control instrument, and to prevent such sparking when the contact 33 moves out of engagement with the slide wire resistance 40, I advantageously provide a switch mechanism 51 which opens the circuit including contact 33 and resistance 40 prior to their separation. The switch mechanism 51 includes contacts 52 in series with the contact 33 and slide wire resistance 40, as shown in Fig. 4. As indicated in the drawings, the contacts 52 may be enclosed in the switch mechanism 51, and in any event the contacts 52 may be of such character that they will not be injured by such sparking as may occur when they are separated. As shown in the drawings, the switch mechanism 51 is of the self-closing type, and is periodically opened by a lever 53 pivoted at 54 and operatively engaged by a second cam 55 carried by the shaft 45.

As shown in Fig. 4, the resistance 40 forms the measuring potentiometer resistance of a bridge circuit which includes a follow-up potentiometer resistance 60. The latter has one end connected to one end of the resistance 40 through an electromagnetic winding 61 and has its other end connected to the second end of the resistance 40 by a second electromagnetic winding 62. As shown in Fig. 4, the windings 61 and 62 are arranged side by side and are respectively associated with the armature members 63 and 64, to move a pivoted contact member 65 into engagement with a contact 66 or into engagement with a contact 67, when the strength of the current through the winding 61 rises above or falls below the strength of the current in the coil 62. When the bridge circuit is so balanced that the current flows through the windings 61 and 62 are equal, the contact 65 occupies a neutral position out of engagement with each of the contacts 66 and 67.

The contacts 66 and 67 are connected to two of the three terminals of a reversible electric motor 68 which has its third terminal connected to an electric current supply conductor 69, and a cooperating supply conductor 70 is connected to the contact 65. As shown, the conductors 69 and 70 supply alternating current and a transformer 71 has its primary winding connected between the conductors 69 and 70. One terminal of the secondary winding of the transformer 71 is connected to a contact 72 engaging and movable along the supply wire resistance, and the other terminal of said secondary winding is connected to the contact 50 through the contacts 52 when the latter are closed. The contact 72 is moved along the resistance 60 in one direction or the other in accordance with the direction and extent of rotation of the motor 68, and the rotation of the latter gives an adjustment to a regulator 73 which is proportional to the extent of movement of the motor and is in a direction depending on the direction of such movement. The windings 61 and 62, and associated armature members 63 and 64, contacts 65, 66, and 67, and motor 68 form means responsive to the potentials of the measuring contact 33 and follow-up contact 72, to adjust the latter and to effect a contact adjustment of the regulator 73, on and in accordance with the movement of the meter element 16 in response to variations in the value of the control quantity which determines the pressure in the spiral tube 2.

In the operation of the apparatus shown in Figs. 1-4, at regular intervals, the rotation of the cam 45 moves the member 39 and thereby the resistance 40 into engagement with the measuring contact 33, and then moves the latter to the left as seen in Fig. 3, until the upper portion of the contact 33 engages the contact 50, and the cam 45 effects reverse movements of the parts at intervals alternating with the first mentioned intervals.

When the measuring contact 33 thus engages the contact 50 and measuring resistance 40, the bridge circuit including the resistances 40 and 60 and the windings 61 and 62, is energized. Unless the relative position of the contacts 33 and 72 along the potentiometer resistance 40 and 60, respectively, are then such that the current supplied by the secondary of the transformer 72 to the bridge circuit device divides equally between its two branches, one or the other of the windings 61 and 62 will be more strongly energized than the other and will move the contact 65 into engagement with one or the other of the contacts 66 and 67 and thus start the motor 68 into operation in one direction or the other, depending on which of the two windings 66 and 67, is the more highly energized.

The rotation of the motor 68 thus produced, adjusts the contact 72 along the resistance 60 in the direction to rebalance the bridge and thus return the motor controlling contact 65 to its intermediate position in which the motor 68 is deenergized. As the motor 68 thus gives a rebalancing adjustment to the follow-up contact 72, it gives an adjustment of proportional extent to the valve or other associated regulator 73, in the direction tending to return the contact member 33 to its normal intermediate position, in which the pen 7 and the control point indicating pointer 15 both indicate the same value on the chart 49. As shown, the regulator 73 is a valve which may be employed, for example, to vary the fuel supply to a furnace as required to regulate furnace temperature measured by a fluid pressure thermometer of which the Bourdon spiral 2 forms a part.

If a change in the controlling quantity and resultant adjustment of the contact 33 is of such character that a single energization of the motor 68 is not sufficient to rebalance the bridge, the motor 68 will be reenergized on each subsequent engagement of the contact 33 with the resistance 40 and contact 50 until the bridge circuit is rebalanced.

The energization of the bridge circuit by connecting measuring contact 33 and follow-up contact 72 to a source of current as illustrated in Fig. 4, contributes to mechanical simplicity and relatively low operation cost, but necessarily makes it practically desirable that there should be a substantial contact pressure between those contacts and the resistances, which they respectively engage.

By suitably proportioning parts of the apparatus illustrated by Figs. 1-4, however, the contact pressure between the resistance 40 and contact 33 and between the contacts 33 and 50 may be made as large as necessary to insure the proper energization and the desired measuring accuracy of the bridge circuit, without affecting the capacity of the meter element 2 to give the contact 33 adjustment movements of suitable extent along the measuring potentiometer resistance 40, since those adjustment movements may be effected during intervals in which the lever 36 does not hold the contact 33 in engagement with the resistance 40 and contact 50. The intermittent energization of the bridge circuit effected by the apparatus shown in Figs. 1-4, has the inherent advantage of making it practically possible to use a substantially larger bridge energizing current without objectionable conductor heating effects, than it is practically possible to use when the bridge circuit is continuously energized, as has been the regular practice heretofore. The provision of the circuit breaking switch 52 makes it possible to interrupt the relatively large energizing current made possible by intermittent energization without risk of sparking difficulties.

Certain general principles of the present invention may be utilized with apparatus quite different in character from that illustrated in Figs. 1-4, and in Figs. 5 and 6 I have illustrated by way of example, two modified forms of apparatus in which use is made of the general features of the invention employed in the apparatus first described.

In the modification shown in Fig. 5 a rack bar 16A replaces the link 16 of the construction first described, and the control mechanism associated with and actuated by the bar 16A differs in form from the control apparatus associated with and actuated by the link 16. The rack bar 16A of Fig. 5 is held in mesh with a spur gear 80 by a gravitational or other yielding bias force which may be relatively light. The spur gear 80 is eccentrically attached to a member 81 which is pivotally connected at 82 to a supporting arm 83, carried by a rock shaft 84. An arm 85 secured to the rock shaft 84, is in the form of a gear segment and has its teeth in mesh with a worm 87, carried by the shaft of a reversible electric relay motor 86. The rotation of the motor 86 angularly adjusts the rock shaft 84 and its arms 83 and 85, and thus raises or lowers the pivotal support 82 for the member 81.

A bar-like member 90 has its upper end connected to the portion of the member 81 which is normally uppermost by a flexible or hinge suspension element 91. At its lower end the suspended member 90 carries a contact 92, which normally occupies an intermediate portion between contacts 93 and 94, carried by the member 81. The reversible motor has three terminals respectively connected to the contacts 92, 93 and 94, and the connection between the motor and the contacts 92 includes a source of motor energizing current 95.

The member 85 carries a movable slide wire resistance 40A engaged by a stationary contact 33A. The latter is in the form of a spring arm, the resiliency of which determines the engagement pressure of the contact 33A and resistance 40A. The resistance 40A and contact 33A forms measuring resistance and control elements and may replace the measuring contact 33 and resistance 40 of a control system which otherwise may be exactly like that shown diagrammatically in Fig. 4, except that it need not include contacts corresponding to those designated 50 and 52 in Fig. 4. Since the member 85 is adjusted by the relay motor 86, the engagement pressure of the contact 33A and resistance 40A may be made as large as is needed to insure proper bridge energization as well as the desired measuring accuracy.

In the normal condition of the apparatus shown in Fig. 5, the member 81 occupies the position shown in which the suspended contact 92 is intermediate and out of engagement with each of the contacts 93 and 94. On a change, in the value of the controlling quantity, for example, an increase resulting in a corresponding longitudinal adjustment of the rack bar 16A in the downward direction, the interaction between the rack bar teeth and the teeth of the spur gear 80 secured to the member 81 will rotate the latter clockwise about its pivotal connection 82 and thereby move the contact 94 into engagement with the contact 92. When such engagement occurs, the motor 86 is energized for operation in the direction to turn the rock shaft 84 clockwise. This lowers the member 81, and through the gear 80 and rock bar 16A turns said member counterclockwise back into its intermediate position and thus separates the contacts 94 and 92 and thus deenergizes the motor 86. Operations which are the reverse of those just described are effected by a decrease in the control quantity and the resultant elevation of the rack bar 16A.

To avoid troublesome sparking, when the contact 92 separates from contact 93 or 94, those contacts may be immersed in oil held in a closed gas or oil filled chamber formed for the purpose in the member 81, which may have at least one of its side walls formed of transparent material.

In operation during periods in which the control quantity varies but slightly from its normal value, determined by the control point adjustment of the apparatus, the angular and vertical adjustments of the member 81 will be small, and sufficient merely to establish and break contact from time to time between the contact 92 and one or the other of the contacts 93 and 94. On a radical change in operation conditions, however, resulting in a wide immediate departure of the control quantity from its normal value in one direction or the other, the bar 16A will give the member 81 a substantial angular adjustment, and the motor 86 will then operate continuously until the member 81 is given a reverse angular adjustment of equal magnitude.

The contact mechanism shown in Fig. 5 may be made highly sensitive so that the motor 86 will respond suitably to a very small longitudinal movement of the rack bar 16A. As shown, the aligned contacts 93 and 94 are in threaded engagement with the supporting member 81 so that they may be adjusted to make the movement between the contact 92 as small as may be desirable. In some cases the contact when in its intermediate position will be so close to each of the contacts 93 and 94 that there will be current flow between each of those contacts and the contact 92. In such case a very small angular adjustment of the member 81 will increase the current flow through one, and decrease the current flow through the other of the two contacts 93 and 94, sufficiently to operate the motor 86.

It is practically feasible to keep the contact mechanism shown in Fig. 5 suitably compact for most instrument uses, while at the same time permitting the contact lever 90 to have a length as great as a couple of inches, which is quite long enough for a very, very small angular adjustment of the member 81 to have a significant effect on the position of contact 92 relative to the contacts 93 and 94. Obviously moreover, the sensitivity of the contact mechanism may be increased by replacing the simple contact lever 90 by a compound lever.

The sensitivity of the mechanism shown in Fig. 5 is inversely proportional to the distance between the axis of the member 81 and the line of engagement of the rack bar 16A with the gear 80, and may be increased by increasing the lateral displacement of the axis of the gear 80 from the axis of the member 81. With any such displacement the sensitivity of the contact mechanism is at a maximum when the plane including the axes of the gear 80 and member 81 is transverse to the rack bar 16A i. e. when the member 81 occupies its intermediate angular position, and hence when the valve of the control quantity is close to its normal or "control point" value.

In the modified form of the invention shown in Fig. 6, a longitudinal adjustment of the bar 16 gives oscillatory movement to a bell crank lever 96 pivoted at 97' on a member 97. The latter is pivotally connected at 99' to a framework part 99 of the control instrument which is shown in part only in Fig. 6, and which may be identical with the instrument shown in Figs. 1, 2 and 3, in respect to its means for giving the bar 16 its longitudinal movements.

The bell crank 96 supports a contact 100 which normally is in chattering engagement with a contact 101 carried by the support 99. The member 97 includes a gear segment connected by two other gears to the shaft of a reversible electric motor 102. The latter has terminals 105 and 106 connected to supply conductors 103 and 104, by which the motor 102 is continuously energized for operation in the direction to effect counter-clockwise rotation of the member 97, and thus maintain the contact 100 in engagement with the contact 101.

The engagement of contacts 100 and 101 closes a second energizing circuit for the motor 102 which includes those contacts, conductors 107 and 108, the conductor 105, and supply conductors 103 and 104. The energization of the last mentioned circuit gives the motor 102 a torque in the direction to move the contact 100 out of engagement with contact 101, which is stronger than the torque tending to rotate the motor counter-clockwise which is produced by the motor circuit including the conductors 105 and 106.

As the contacts 100 and 101 separate the first mentioned torque is weakened. In consequence, the motor 102 is energized for alternate movements in opposite directions and thus gives the member 97 the oscillatory movements required to maintain a chattering engagement of the contacts 100 and 101, regardless of the value of the control quantity and resultant longitudinal adjustment of the part referred to parts 110 and 33B.

The member 97 supports a measuring resistance 40B engaged by a normally stationary measuring contact 33B with suitable spring pressure. The contact 33B and resistance 40B may form parts of an electric proportioning control system analogous to that shown in Fig. 4, though in the arrangement shown in Fig. 6 it is not the contact 33B but the slide wire resistance element 40B, which is adjusted in accordance with changes in the control quantity, the arrangement shown in Fig. 6 being like the arrangement shown in Fig. 5 in this respect.

As shown in Fig. 6, the normally stationary contact 33B is carried by a gear segment 109 pivotally connected by the pivot 99' to the member 99. The gear segment 109 is in mesh with a spur gear 110 which is journalled on the support 99 and may be angularly adjusted to thereby adjust the contact 33B in calibrating the control system.

While the three control instrument arrangements illustrated in Figs. 1-4, in Fig. 5 and in Fig. 6, are specifically different from one another, they are generically alike in that each permits of effective use of an electric proportioning system of simple form, without operative uncertainty due to insufficient pressure between a bridge circuit slide wire resistance and cooperating contact, and in that each permits bridge circuit slide wire resistance and contact device adjustments to be effected in suitable correspondence with the changes in position of a meter element too delicate to move a measuring contact along a slide wire resistance engaging the latter with a suitable contact pressure.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent, is:

1. The combination in an electric proportioning system, of a bridge circuit including a measuring potentiometer resistance, a follow-up potentiometer resistance, a measuring contact, means for pressing said contact into engagement with said measuring resistance and thereby creating frictional resistance to the relative adjustment of said measuring contact and measuring resistance, and a follow-up contact in engagement with and adjustable relative to said follow-up resistance, a source of current, means through which said source supplies bridge energizing current to said contacts, a meter element responsive to variations in a control quantity and given movements independent of said frictional resistance and proportional to said variations, means actuated by said meter element to adjust said measuring contact relative to said measuring resistance in accordance with said movements, a reversible electric control motor, adjustable motor energizing connections separate from said circuit and through which said source supplies energizing current to said motor, and a relay mechanism jointly responsive to the position of said contacts relative to the said resistances respectively engaged by said contacts for adjusting said motor energizing connections to effect operation of said motor in the direction and to the extent required for the adjustment of said follow-up contact on and in accordance with each adjustment of said measuring contact.

2. The combination in an electric proportioning system, of a bridge circuit including a measuring potentiometer resistance, a follow-up potentiometer resistance, a measuring contact, means for pressing said measuring contact into engagement with said measuring resistance at intervals, and a follow-up contact in engagement with and adjustable relative to said follow-up resistance, a source of bridge energizing current connected to said contacts, means including a meter element operatively connected to the measuring contact and adapted to adjust the latter relative to said measuring resistance during intervals alternating with the first mentioned intervals and in accordance with variations in a control quantity, a reversible electric motor, adjustable energizing means for said motor separate from said bridge circuit and supplying energy to said motor at a rate independent of the magnitude of current flow in said bridge circuit and means responsive to the position of each of said contacts relative to the said resistance with which it is in engagement for adjusting said energizing means to effect adjustments of said follow-up contact on and in proportion to each adjustment of said measuring contact.

3. The combination in an electric proportioning system, of a bridge circuit including a measuring potentiometer resistance element, a measuring contact element, means for pressing said elements together thereby creating frictional resistance to their relative adjustment, a follow-up potentiometer resistance, and a follow-up contact in engagement with and adjustable relative to said follow-up resistance, means for adjusting said follow-up contact on and in accordance with each adjustment of said measuring contact element, and means for relatively adjusting said elements in accordance with variations in a control quantity comprising a support on which one of said elements is mounted, a member pivotally connected to said support to turn relatively thereto about a horizontal axis, a spur gear secured to said member with its axis parallel to the first mentioned axis, a rack bar extending transversely to said axes and in mesh with said gear, means for adjusting said rack bar longitudinally in accordance with variations in said control quantity, contacts supported by said member and selectively actuated by rotative movement of said member in either direction out of an intermediate angular position, and means actuated by said contacts on each movement of said member out of its intermediate angular position to move said support and thereby relatively adjust said elements and return said member back into said position.

4. An electric proportioning system as specified in claim 3 in which the axes specified therein are laterally displaced from one another.

5. The combination in an electric proportioning system, of a bridge circuit including a measuring potentiometer resistance element, a measuring contact element, means for pressing said elements together and thereby creating frictional resistance to their relative adjustments, a follow-up potentiometer resistance, and a follow-up contact in engagement with and adjustable relative to said follow-up resistance, means for adjusting said follow-up contact on and in accordance with each adjustment of said measuring contact, and means for relatively adjusting said elements in accordance with variations in a control quantity, comprising a stationary support on which one of said elements is mounted, a member pivotally connected to said support to turn about an axis, a contact lever pivotally connected to said member to turn about an axis laterally displaced from the first mentioned axis, means for angularly adjusting said lever in accordance with variations in a control quantity, a contact carried by said lever, a cooperating contact mounted on said support and adapted to be engaged and disengaged by the first mentioned contact as a result of angular adjustments of either said lever or said member, and means controlled by the said contacts for angularly adjusting said member as required to maintain said contacts in chattering engagement.

6. In a control instrument, the combination with a support, a member pivotally connected to said support to turn about a horizontal axis, a gear secured to said member with its axis parallel to, but laterally displaced from, the first mentioned axis, a longitudinally adjustable rack bar extending transversely to said axes and in mesh with said gear, contacts supported by said member and selectively actuated by rotative movement of said member in either direction out of an intermediate angular position, and means actuated by said contact on each movement of said member out of its intermediate angular position to move said support in the direction of the length of said rack bar as required to turn said member back into said position.

7. The combination with a measuring member pivoted to deflect about an axis on and in accordance with changes in the quantity measured, said member comprising a contact portion at a distance from said axis, a contact element at one side and a slide wire resistance element at the opposite side of the plane of movement of said contact and each normally out of engagement with the latter, means for periodically moving one of said elements towards said plane of movement to engage said contact and deflect the latter into engagement with the other element, contacts connected in series with said contact and resistance and means for causing said contacts to engage and then separate during each period in which said contact elements are in engagement.

8. The combination in an electric proportioning system, of a bridge circuit including a measuring potentiometer resistance and a follow-up potentiometer resistance, a measuring contact, means effecting relative adjustments of said contact and measuring resistance in accordance with variations in a control quantity, means periodically energizing said circuit a reversible electric motor, adjustable energizing means for said motor separate from said bridge circuit and supplying energy to said motor at a rate independent of the magnitude of current flow in said bridge circuit and means responsive to the changes in current distribution in said circuit, when energized, produced by said adjustments for adjusting said energizing means to effect relative adjustments of said follow-up contact and follow-up resistance tending to maintain a predetermined current distribution.

9. The combination in an electric proportioning system, of a bridge circuit, a measuring potentiometer resistance, a follow-up potentiometer resistance, a measuring contact and a follow-up contact, measuring means effecting relative adjustments of said measuring contact and measuring resistance in accordance with variations in a control quantity, means periodically supplying energizing current to said circuit through said contacts and the points of said resistance respectively engaged by said contacts, a reversible electric motor, adjustable energizing means for said motor separate from said bridge circuit and supplying energy to said motor at a rate independent of the magnitude of current flow in said bridge circuit and means responsive to the changes in current distribution in said circuit, when energized, produced by said adjustments for adjusting said energizing means to effect relative adjustments of said follow-up contact and follow-up resistance tending to maintain a predetermined current distribution.

10. The combination in an electric proportioning system of a bridge circuit, a measuring potentiometer resistance, a follow-up potentiometer resistance, a measuring contact and a follow-up contact, measuring means effecting relative adjustments of said measuring contact and measuring resistance in accordance with variations in a control quantity, means periodically supplying energizing current to said circuit through said contacts and the points of said resistance respectively engaged by said contacts, said last mentioned means comprising a periodically operating switch and a source of current connected between said contacts, a reversible electric motor, adjustable energizing means for said motor separate from said bridge circuit and supplying energy to said motor at a rate independent of the magnitude of current flow in said bridge circuit and means responsive to the changes in current distribution in the energized circuit produced by said adjustments for adjusting said energizing means to effect relative adjustments of said follow-up contact and follow-up resistance tending to maintain a predetermined current distribution.

11. The combination in an electric proportioning system of a bridge circuit, including a measuring potentiometer resistance, a follow-up potentiometer resistance, a follow-up contact adjustable along the length of and normally engaging the last mentioned resistance, a measuring contact normally out of engagement with said measuring resistance, means effecting relative adjustments of said contact and measuring resistance along the length of the latter in accordance with variations in a control quantity, means periodically moving said measuring contact transversely of said measuring resistance into and out of engagement with the latter, means for energizing said circuit during a portion of each period of engagement of the last mentioned resistance and contact, said last mentioned means comprising a periodically operating switch and a source of current connected between said contacts, a reversible electric motor, adjustable energizing means for said motor separate from said bridge circuit and supplying energy to said motor at a rate independent of the magnitude of current flow in said bridge circuit and means responsive to the changes in current distribution in the energized circuit produced by said adjustments for adjusting said energizing means to effect relative adjustments of said follow-up contact and follow-up resistance tending to maintain a predetermined current distribution.

EDWIN C. BURDICK.

REFERENCES CITED

The following references are of record in the file of this patent:

UNITED STATES PATENTS

| Number | Name | Date |
| --- | --- | --- |
| 649,644 | Norris | Aug. 11, 1900 |
| 710,045 | Day | Sept. 30, 1902 |
| 1,406,377 | Harvey | Feb. 14, 1922 |
| 1,732,060 | Moeller et al. | Oct. 15, 1929 |
| 1,774,673 | Schleicher et al. | Sept. 2, 1930 |
| 1,914,481 | Brown | June 20, 1933 |
| 2,047,727 | Dueringer | July 14, 1936 |
| 2,214,609 | Drake | Sept. 10, 1940 |
| 2,255,601 | Schmitt | Sept. 9, 1941 |
| 2,292,937 | Harrison | Aug. 11, 1942 |